US008536441B2

(12) United States Patent
Giacalone et al.

(10) Patent No.: US 8,536,441 B2
(45) Date of Patent: Sep. 17, 2013

(54) SOLAR APPARATUS FOR CONCURRENT HEATING AND POWER GENERATION DUTY

(75) Inventors: Michele Luca Giacalone, Budoia (IT);
Antonio Sichirollo, Millan (IT);
Ermanno Perenthaler, Mezzolombardo (IT)

(73) Assignee: PERER S.R.L., Mezzolombardo (IT)

( * ) Notice: Subject to any disclaimer, the term of this patent is extended or adjusted under 35 U.S.C. 154(b) by 211 days.

(21) Appl. No.: 12/737,005

(22) PCT Filed: Jul. 6, 2009

(86) PCT No.: PCT/IB2009/006213
§ 371 (c)(1),
(2), (4) Date: Dec. 1, 2010

(87) PCT Pub. No.: WO2010/004420
PCT Pub. Date: Jan. 14, 2010

(65) Prior Publication Data
US 2011/0162692 A1 Jul. 7, 2011

(30) Foreign Application Priority Data

Jul. 11, 2008 (IT) .............................. PN2008A0059

(51) Int. Cl.
*H01L 31/042* (2006.01)
(52) U.S. Cl.
USPC .......................................... 136/248; 136/246

(58) Field of Classification Search
USPC ................. 136/246, 248, 244, 251; 126/572, 126/574, 576, 600, 684, 692
See application file for complete search history.

(56) References Cited

U.S. PATENT DOCUMENTS

| 4,493,940 A * | 1/1985 | Takaoka | 136/248 |
| 2003/0201008 A1 * | 10/2003 | Lawheed | 136/246 |

\* cited by examiner

*Primary Examiner* — Eli Mekhlin
(74) *Attorney, Agent, or Firm* — Bucknam & Archer

(57) ABSTRACT

Solar apparatus for concurrent heating and power-generation duty having a base load bearing structure and a load bearing structure supported on the base load bearing structure secured to the plant solar concentrator so as to allow rotation of the concentrator with an established maximum rotation angle, with both a first alternate rotation movement in a circular direction and a horizontal plane along the base load bearing structure, and a second alternate movement along a curved path around a vertical plane orthogonal to the horizontal plane. The solar concentrator is actuatable with said first and second movement during the day by respective first and second actuators, controlled by a microprocessor, depending on the corresponding orientations of the concentrator, detected by first and second sensors, in a manner to orientate the concentrator for receiving maximum solar radiation during the day.

4 Claims, 17 Drawing Sheets

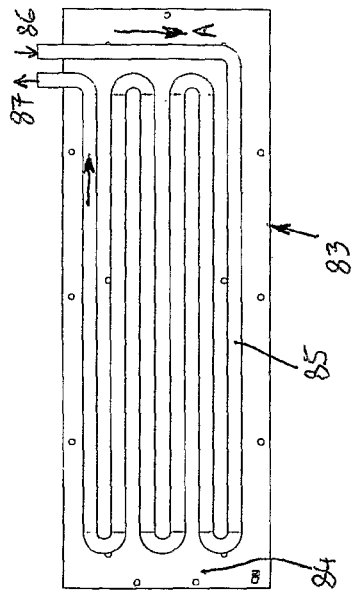
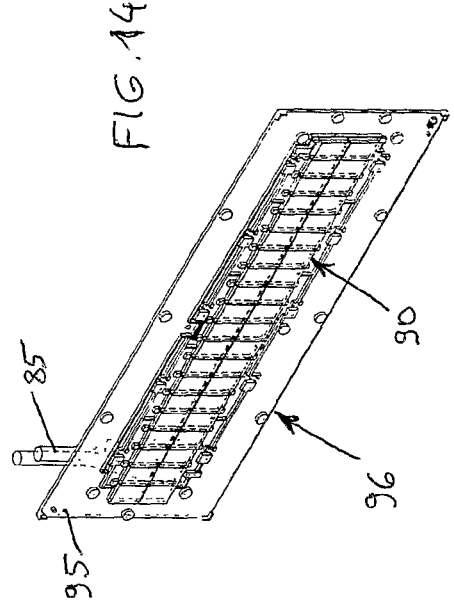
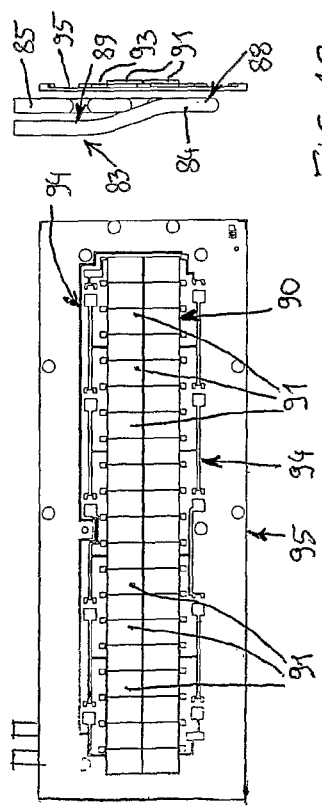
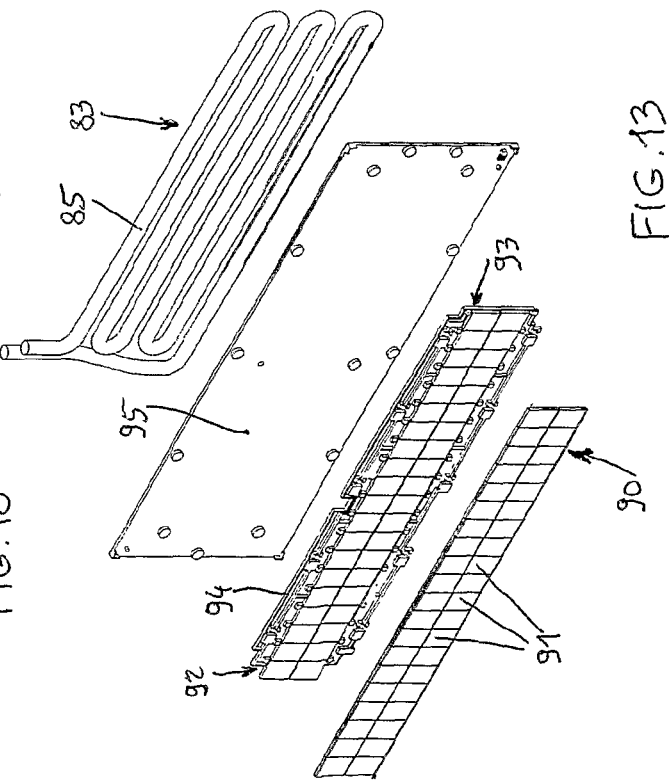

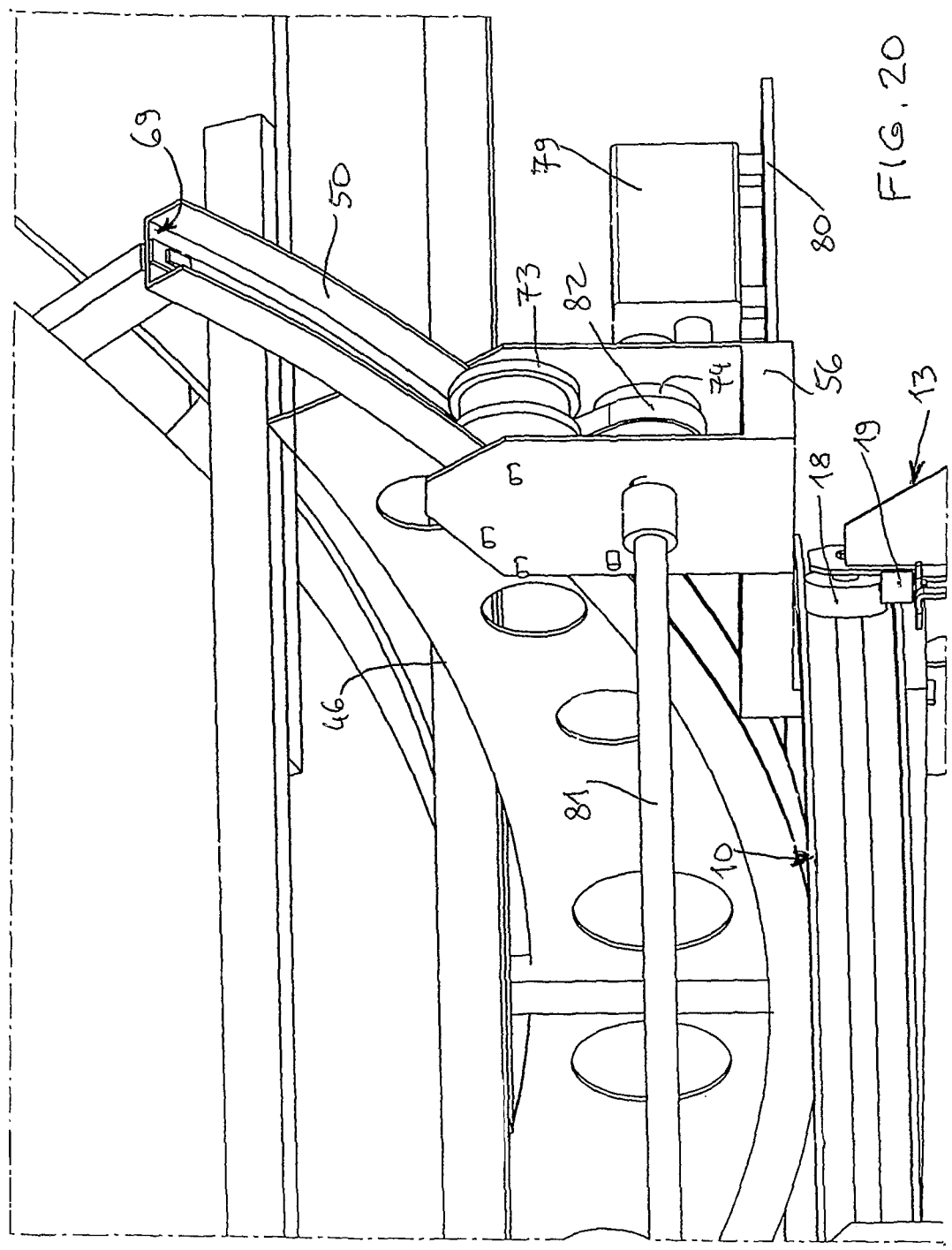

SOLAR APPARATUS FOR CONCURRENT HEATING AND POWER GENERATION DUTY

CROSS REFERENCE TO RELATED APPLICATIONS

This application is the National Stage of PCT/IB2009/006213 filed on Jul. 6, 2009, which claims priority under 35 U.S.C. §119 of Italian Application No. PN2008A000059 filed on Jul. 11, 2008. The international application under PCT article 21(2) was published in English.

The invention relates to a solar apparatus for concurrent heating and power-generation duty, comprising at least a solar concentrator adapted to be actuated by suitable mechanisms with such movements as to be oriented variously toward the sun during the day, in a manner to receive the maximum quantity of solar energy for heating and accumulating liquids for different applications and for generating electric energy with high energetic efficiencies.

Solar plants of various kinds for heating and accumulating liquids for heating plants are known, which are substantially constituted by solar panels of flat form with stationary installation, having a pre-established orientation position toward the sun, without the possibility to change such an orientation during the day, in a manner to receive a pre-established amount of solar energy, such plants being also constituted by a heat exchanger into thermal conductor contact with the solar panels, which is adapted to receive the collected solar energy and to heat the liquid circulating through a separate hydraulic circuit, which is subsequently conveyed into thermal insulated accumulation reservoirs, where it is collected and distributed through hydraulic lines when the use of the same heated liquid is needed. Further known solar plants for heating and accumulating liquids for heating plants and also for different uses, such as for example cooking foods, are constituted by solar concentrators of the solar energy having parabolic form or the form of circular sectors, which are constituted by a set of shaped elements made of reflecting material, joined to each other and supported by a load bearing structure fixed to the ground, in a way to receive the solar energy and to concentrate the same in a focus point, where the collected solar energy is utilized for heating the liquid, or for cooking foods. In the first case, heating of the liquid is effected by arranging in the focus point one or more containers of the liquid to be heated, in a manner to heat directly such liquid, which then may be drawn directly from such containers when its use is requested, or it may be conveyed into thermal insulated storage reservoirs for being subsequently drawn. As alternative, heating of the liquid may be effected through a heat exchanger arranged in the solar concentrator focus point, in which exchanger the liquid to be heated circulates, which is into thermal conductor contact with the concentrated solar energy, and so is heated and conveyed toward thermal insulated storage reservoirs for being subsequently drawn. In the second case, cooking of foods is effected by arranging on the concentrator focus point some receptacles or fixed supports, into which the foods are disposed and cooked directly by the concentrated solar energy for the respectively established cooking time. In these kinds of solar plants, all the solar energy concentrators which are employed may be installed with pre-established fixed orientations, such that to collect the solar energy in a pre-established extent during the day, or they may be installed with variable orientations, determined by suitable mechanisms associated with the same concentrators, such that to receive and concentrate the possible maximum quantity of solar energy during the day, in order to obtain high thermal efficiencies.

Moreover, solar plants for generating electric energy are known, which are constituted by photovoltaic panels of traditional type, built in on to adequate support structures installed on to grounds or buildings, and adapted to receive the solar energy and generate directly electric energy, which is then utilized immediately for different applications, or it may be stored into electric storage batteries connected to such plants, and utilized on subsequent moments. Generally, the photovoltaic panels of these solar plants are installed with pre-established fixed orientations, such that to collect the solar energy in a pre-established amount during the day for obtaining electric energy.

The object of the present invention is to realize a new type of solar plant, having such characteristics as to receive the possible highest quantity of solar energy during the day, with consequent high energetic efficiencies, and to produce not only the heating of liquids, but also the generation of electric energy, thereby obtaining a combination of performances which it was impossible to obtain with the above described solar plants existing at the present time. This solar plant is realized with the constructive characteristics and the advantages substantially described, with particular reference to the attached patent claims.

The invention will be understood better from the following description, given by way of not-limiting example only and with reference to the accompanying drawings, in which:

FIG. 10 shows a plan view of two other component parts of the present solar plant, assembled to each other;

FIG. 11 shows a plan view of one of the component parts of FIG. 10;

FIG. 12 shows a side view of the reciprocal arrangement of the component parts of FIG. 10 of the present plant, assembled to each other;

FIG. 13 shows an exploded perspective view with a determinate angle of view of the reciprocal arrangement of the component parts of FIG. 10;

FIG. 14 shows a perspective view, with the same angle of view of FIG. 13, of the component parts of FIG. 10, assembled to each other;

FIG. 20 shows a back perspective view of the actuating mechanism of FIG. 17;

Figure 1:
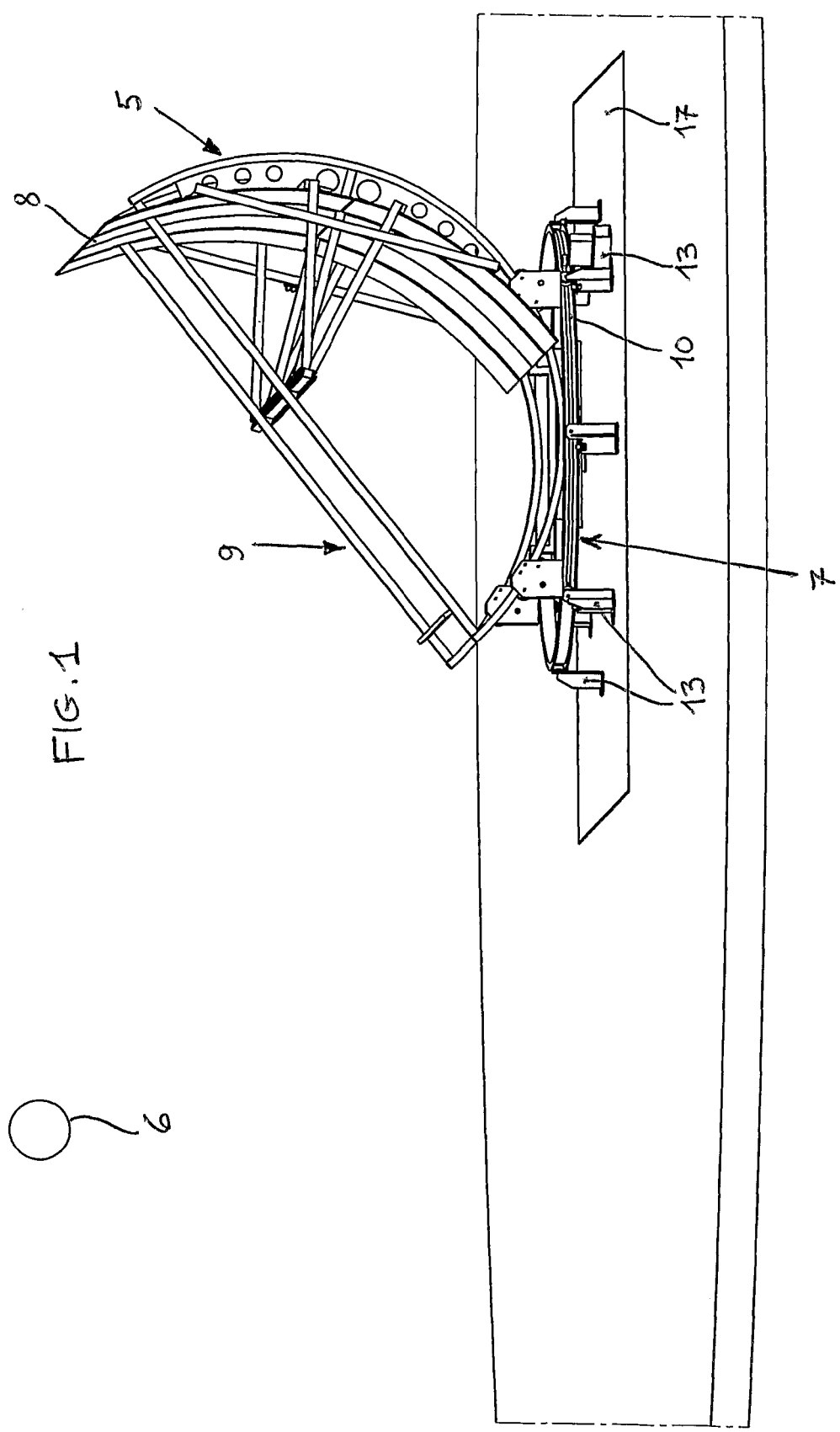
FIG. 1 shows a perspective view with a determinate angle of view of the reciprocal arrangement of a solar plant according to the invention, displaced in an operative position, with respect to the sun.
Figure 2:
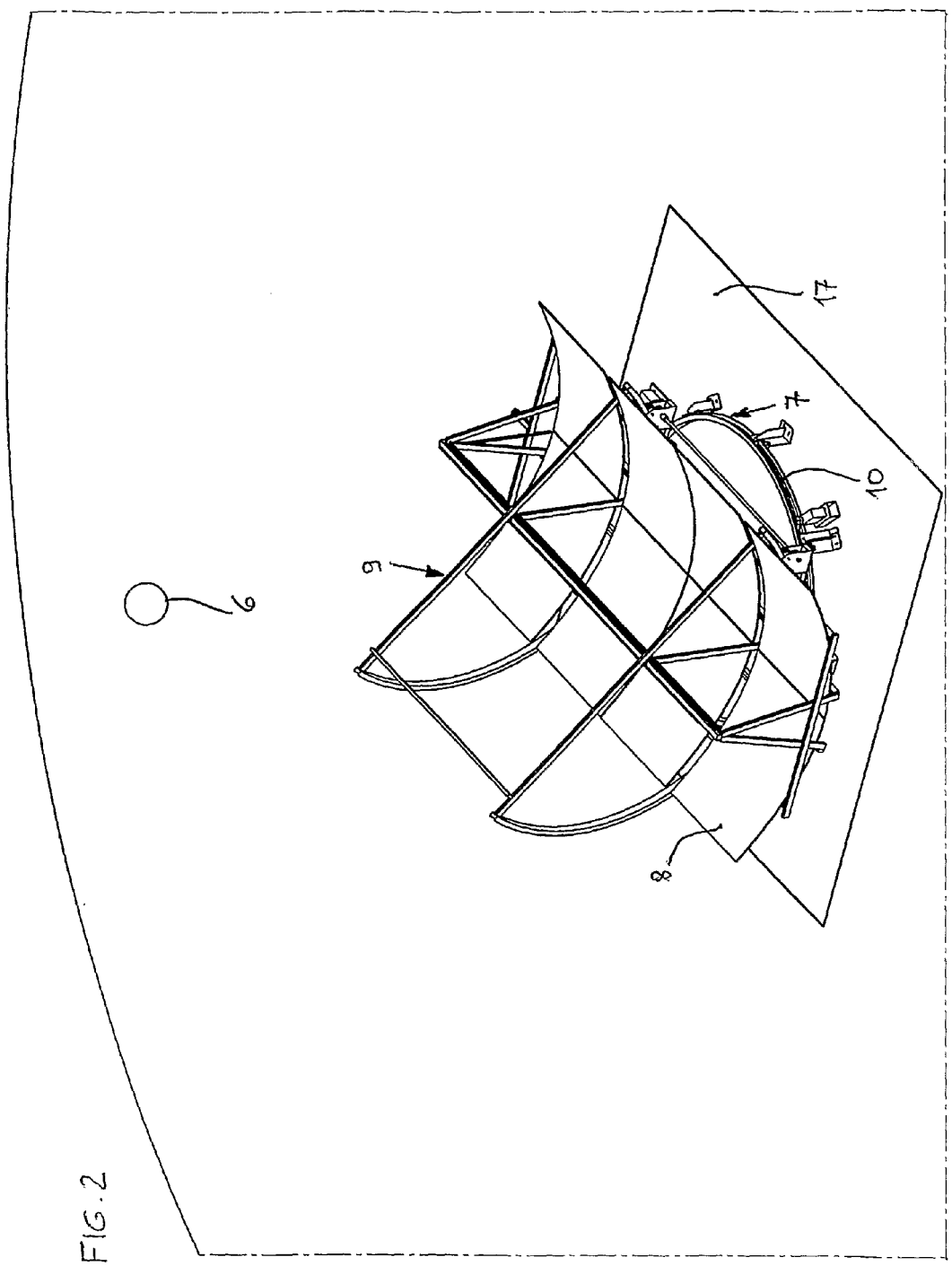
FIG. 2 shows a perspective view with another angle of view of the reciprocal arrangement of the solar plant of FIG. 1, displaced into another operative position, with respect to the sun.
Figure 3:
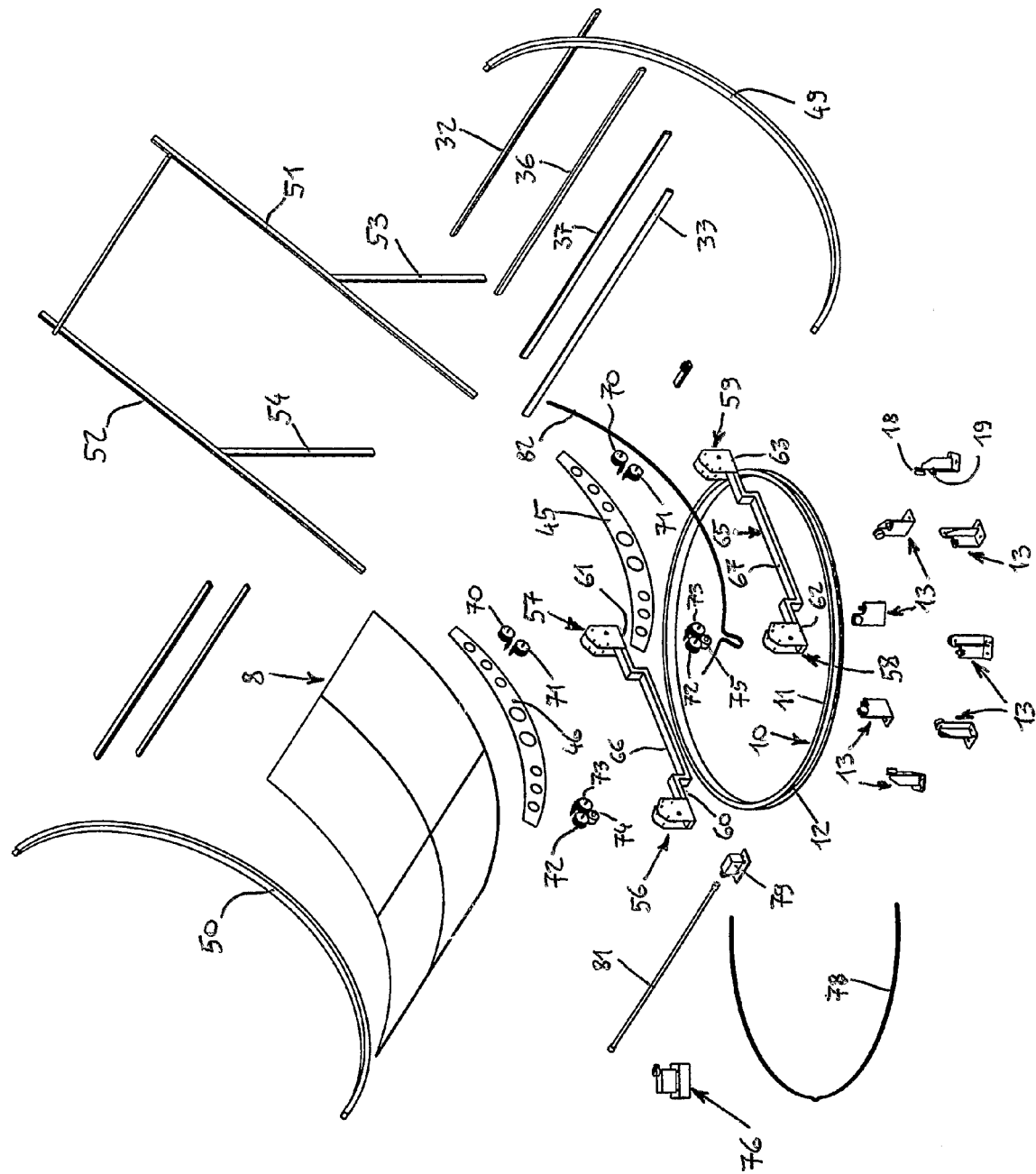
FIG. 3 shows an exploded and front perspective view of the various component parts of the present solar plant.
Figure 4:
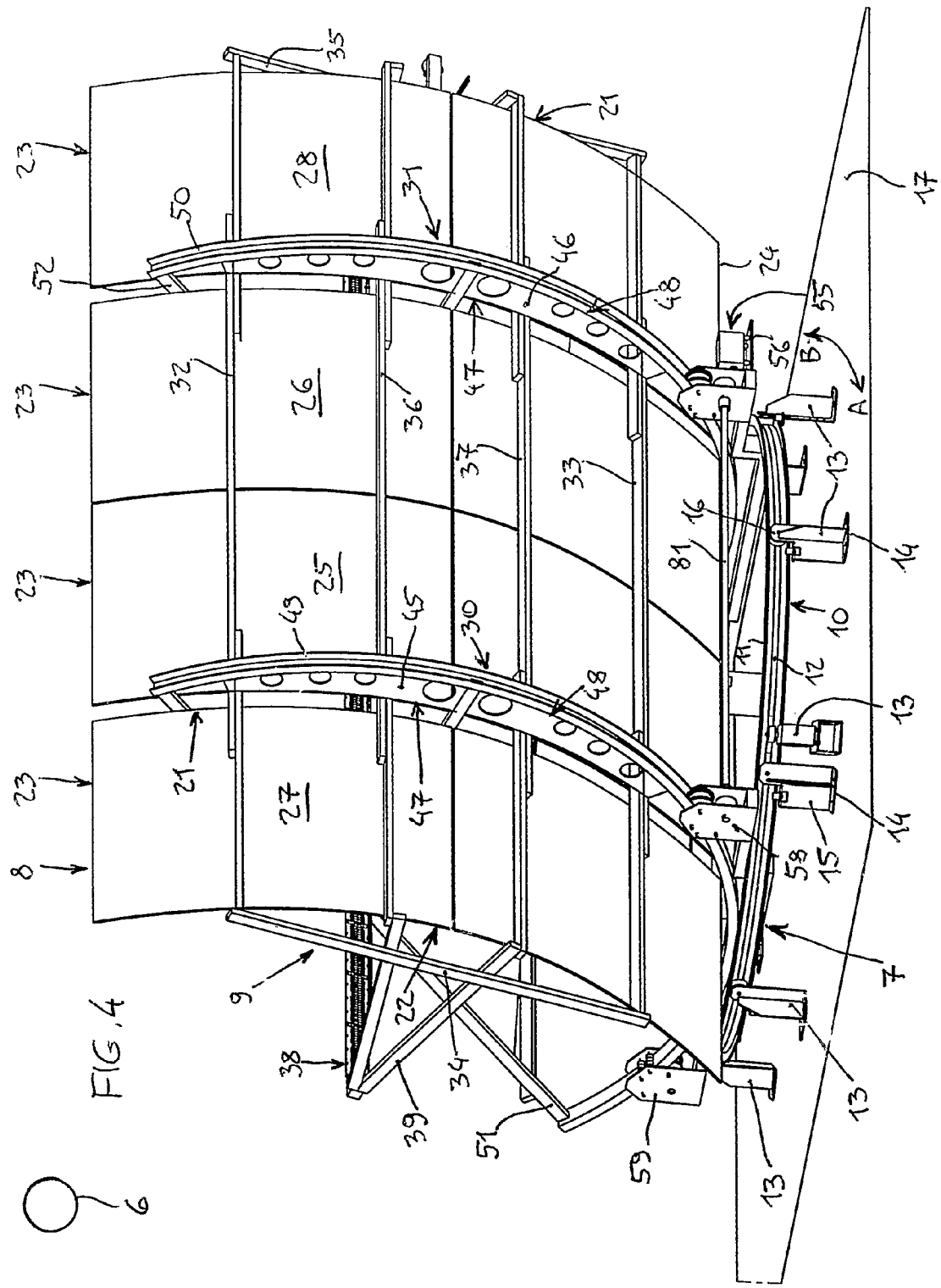
FIG. 4 shows an enlarged back perspective view of the solar plant according to the invention, displaced in the same operative position of FIG. 1.
Figure 5:
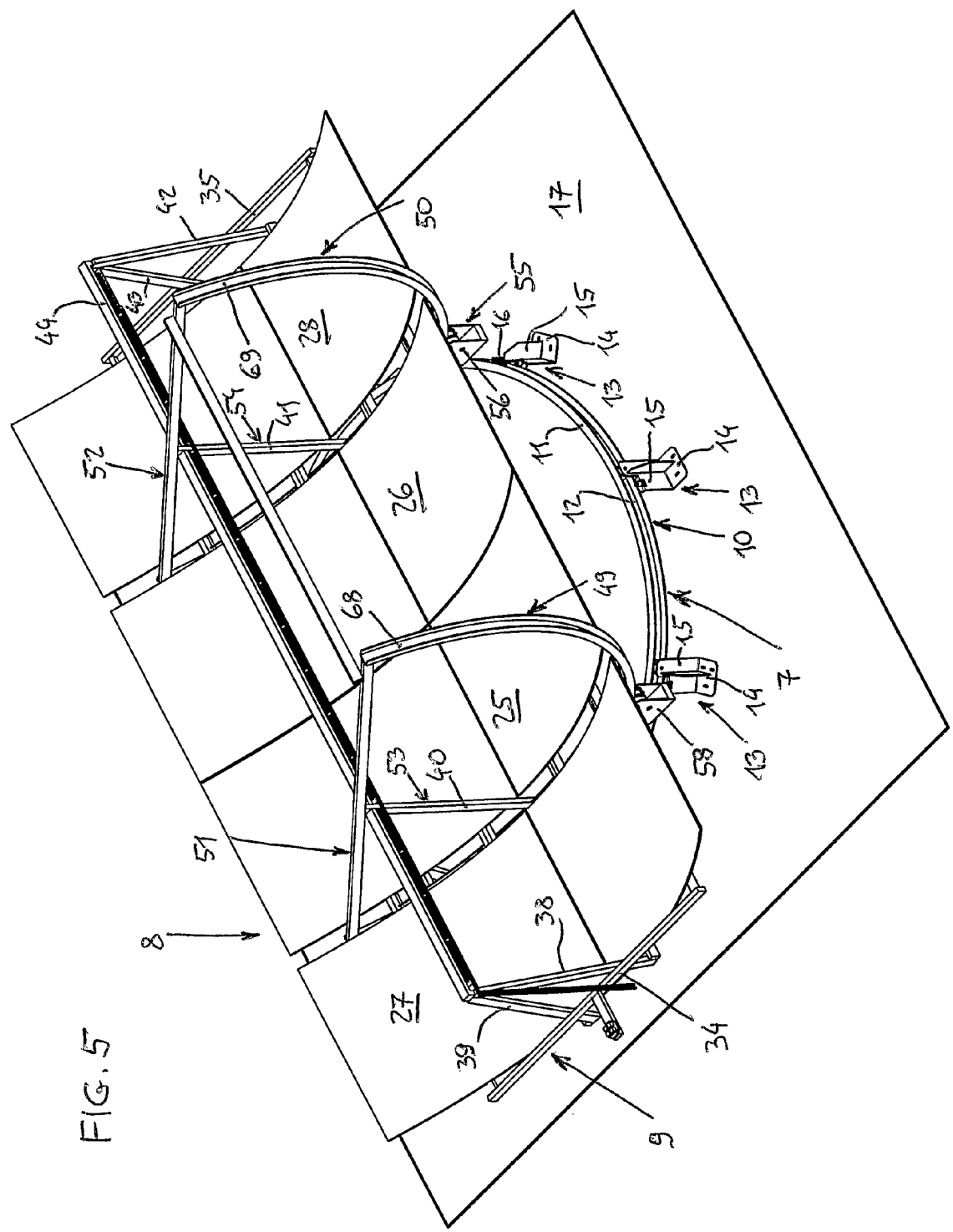
FIG. 5 shows a view from a side of the solar plant displaced in the operative position of FIG. 2.
Figure 6:
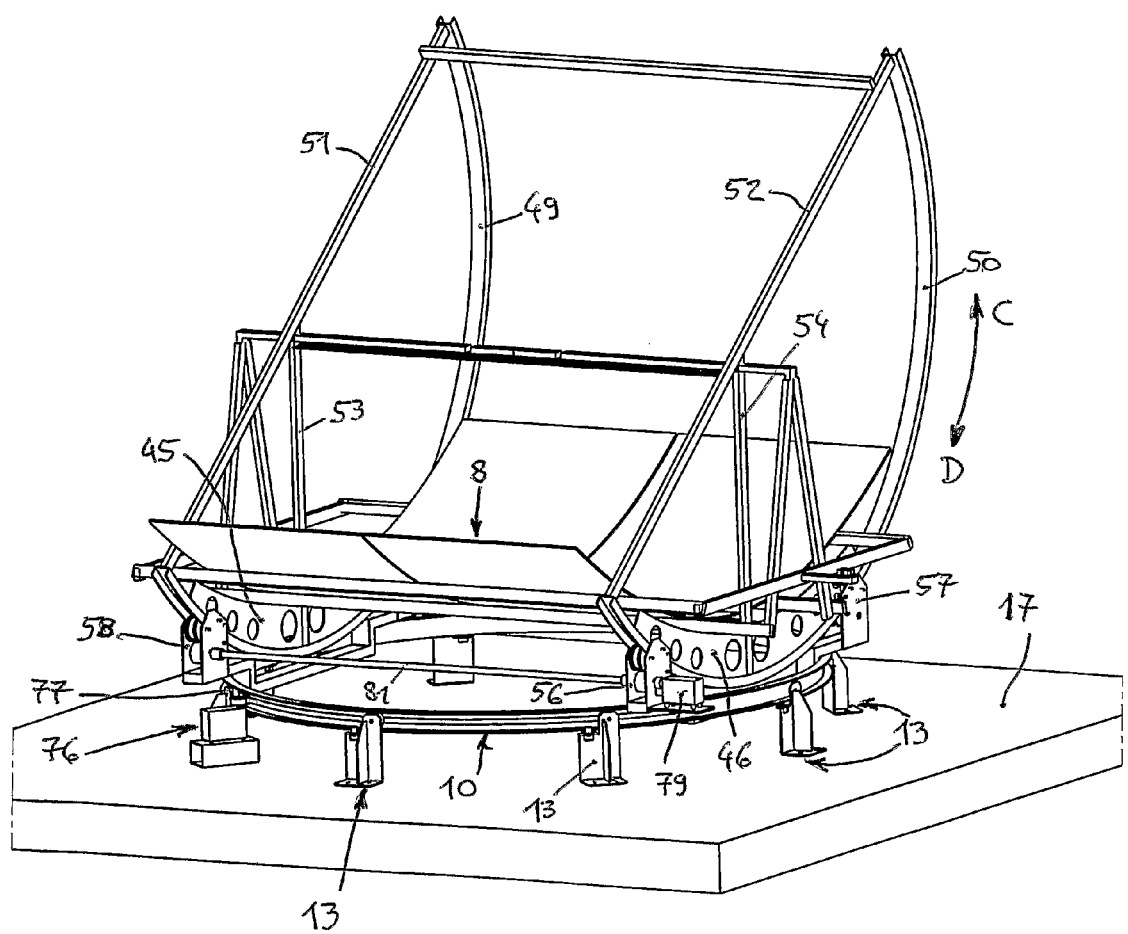
FIG. 6 shows an enlarged side perspective view and with another angle of view of the present solar plant, displaced in the same operative position of FIG. 2.
Figure 7:
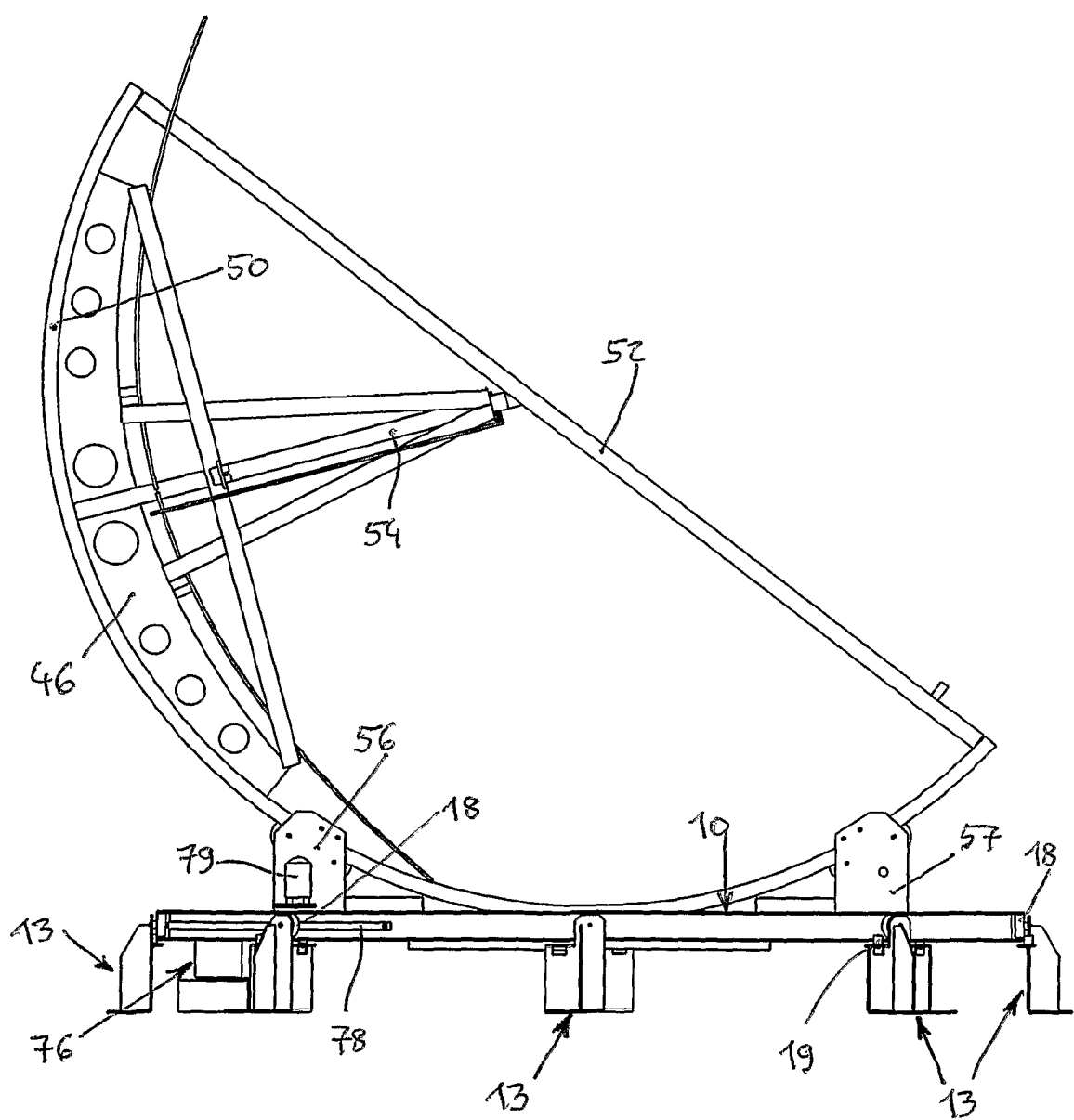
FIG. 7 shows an enlarged side perspective view and with another angle of view of the solar plant displaced in the same operative position of FIG. 4.
Figure 9:
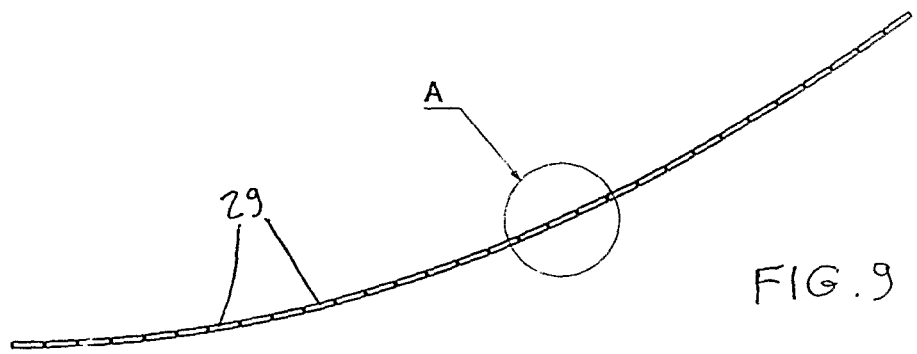
FIG. 9 shows a side view of the portion of the plant component part of FIG. 8.
Figure 9A:
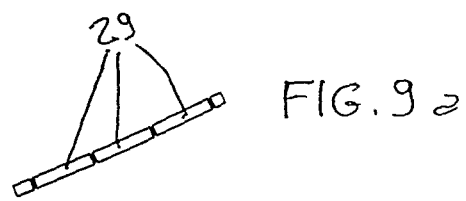
FIG. 9a shows, with the same view of FIG. 9, an enlarged constructive item of the component part illustrated in such a Figure.
Figure 8:
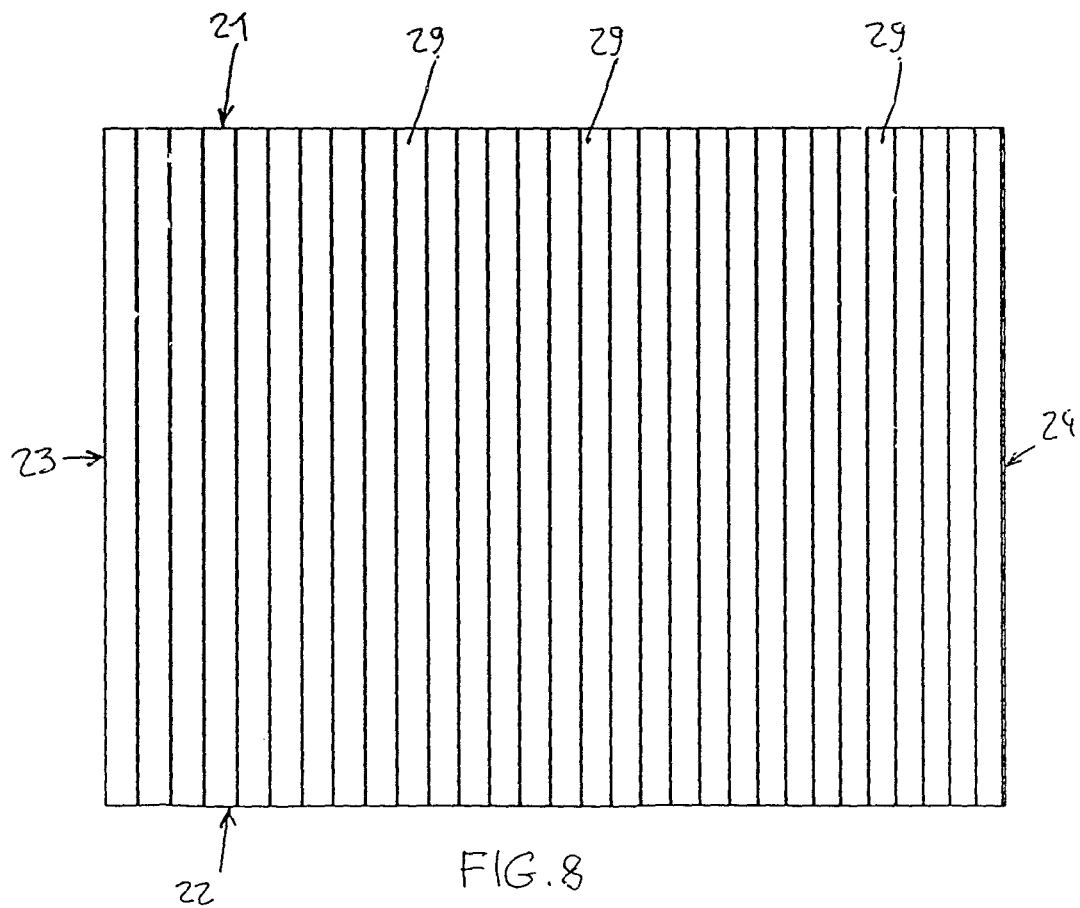
FIG. 8 shows a front view of a portion of a component part of the solar plant according to the invention.
Figure 15:
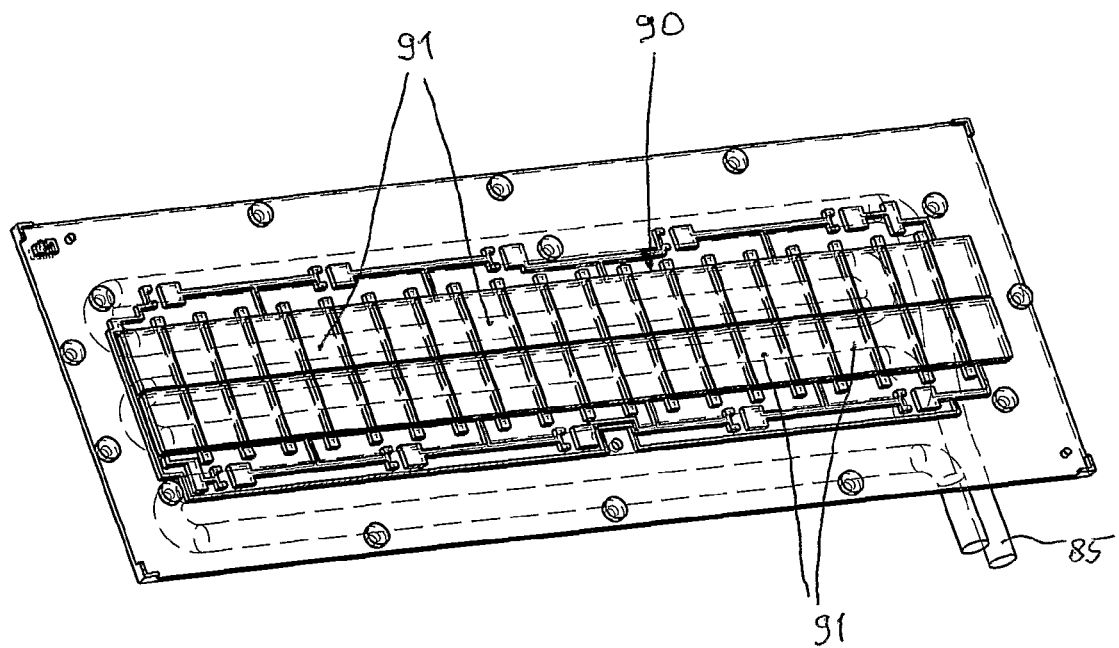
FIG. 15 shows an enlarged perspective view, with a different angle of view of FIG. 14, of the component parts of FIG. 10, assembled to each other.

The above Figures illustrate schematically a solar plant according to the invention, for heating and generating electric energy, which is realized orientable with respect to the sun in a manner to receive the possible highest quantity of solar energy during the day, in order to heat liquids for different applications and to generate electric energy with high energetic efficiencies. Turning now to the FIGS. 1, 4 and 5, and the FIGS. 2, 6 and 7, in which it is schematically shown the solar plant according to the invention, with two different orientations thereof with respect to the sun 6 during the day, it is noted that it is constituted substantially by a base load bearing structure 7 applied to the ground and made in the manner and for the scope which will be described later on, and by at least a solar concentrator 8 secured to another load bearing structure 9, supported by the base load bearing structure 7 and made in a manner to allow the rotation of the solar concentrator 8 with an established maximum angle of rotation, with both a movement in the circular direction and on a horizontal plane along the base load bearing structure 7, and a movement along a curved path around a vertical plane orthogonal to the above horizontal plane. As visible from such Figures, and with a further reference to the FIG. 3 in which the various component parts separated to each other of the present solar plant are shown, the base load bearing structure 7 is constituted by a metallic horizontal circular rail 10, having a determinate diameter, shaped with an upper flat edge 11 and an external guide groove 12 along its periphery, which rail is supported by a set of metallic lower flasks 13, identical to each other and distributed at regular spaces along the entire periphery of the same rail, each flask being bent to form a lower support base 14, a vertical shank 15 and an upper head 16, of which the support base 14 is anchored by means of bolts or the like (not indicated) to a horizontal base plate 17 made of adequate rigid and resistant material (for example concrete, metal etc. . . . ) which is suitably fixed to the ground, and the upper head 16 is provided with two idle wheels 18 and 19 pivoted to the same in an overlapped and slightly spaced away position, which wheels are respectively disposed in the guide groove 12 and against the lower flat edge 11 of the circular rail 10, and are slidable in these positions when such rail is driven in rotation, in either one of its rotation directions A and B opposite to each other, by a first actuating mechanism 20 which will be described. Instead of using the idle wheels, the upper head 16 may be also provided with sliding blocks or other sliding elements co-operating with the circular rails 10, to determine the rotation of the same rail and therefore also of the solar concentrator 8, thus without departing from the protection field of the invention. In turn, the solar concentrator 8 is constituted, as visible also from the FIGS. 8, 9 and 9 a), by a set of curved walls of reflecting metallic or not metallic material, for example aluminium, arranged adjacent to each other and joined to the load bearing structure 9, which are made with the same width and length and the same bending and are delimited by respective flat side edges 21 and 22, parallel to each other and by respective front edges 23 and 24 parallel to each other and orthogonal with respect to such side edges.

In the present example, there are provided two curved central walls 25 and 26 and two curved side walls 27 and 28, of which the adjacent side edges of the central walls are joined to each other and the respective side edges of the side walls 27 and 28 are slightly spaced away with respect the opposite side edges of such central walls. Each curved wall is formed by a plurality of thin metallic or not metallic flat elements 29 made of reflecting material, having rectangular shape, adequately joined to each other along their respective longitudinal edges, and reciprocally bent to form the curvature of the relative curved wall. Such metallic or not metallic elements 29 may be realized with curved shape too, with the same curvature of the relative curved wall. Finally, by referring now always to FIGS. 1-6, it is noted that the further load bearing structure 9 is constituted by a set of rectilinear bars and a pair of side semicircular elements 30 and 31, arranged parallel and spaced away from each other in the length direction of the curved walls 25-28 and secured to the different curved walls, of which in the illustrated example the rectilinear bars are formed by a pair of longitudinal bars 32 and 33 joined at their end portions by a pair of transversal bars 34 and 35 (see FIG. 4), and all secured to the rear surface of the various curved walls 25-28, thereby forming a support frame for the same curved walls. Such further load bearing structure 9 is additionally constituted by further rectilinear bars supporting the curved walls 25-28, in the illustrated example formed by two additional longitudinal bars 36 and 37, also secured to the rear surface of the same curved walls, in a position interposed between the previous longitudinal bars 32 and 33, said additional bars being joined at one end portion of a set of transversal bars 38, 39, 40, 41, 42 and 43, which are projected beyond the front surface of the various curved walls 25-28 and the other end portion of which is joined by a further transversal bar 44. Finally, this further load bearing structure 9 is constituted by a pair of metallic reinforcing elements 45 and 46 having semicircular shape, identical and spaced away to each other in the longitudinal direction of the curved walls 25-28 and arranged with respect to these latter in a lateral position (see FIGS. 6 and 7), or in a central position (see FIG. 4), such metallic elements being shaped with a respective inner semicircular surface 47 which is secured for its entire extent to all the longitudinal bars 32, 33 and 36, 37, and with a respective external semicircular surface 48 which is secured for its entire extent to a corresponding semicircular element 30 and 31, shaped like a semicircular rail 49 and 50, the relative free end portions of which are joined to each other by means of a pair of rectilinear bars 51 and 52, which in turn are joined in a position thereof, intermediate with the same rails, by means of a pair of tension rods 53 and 54. The semicircular rails 49 and 50 are shaped in a manner to be able to rotate along a semicircular curved path, with a determinate stroke, together with the curved walls 25-28 receiving the solar energy, in a vertical plane orthogonal with respect to the horizontal plane of rotation of the circular rail 10, when the same rails are driven by a second actuating mechanism 55 which will be described later on. To this aim, the semicircular rails 49 and 50 are supported in a slidable way by a set of supporting and sliding lower flasks 56, 57, 58 ad 59, secured to the circular rail 10, and formed by a first pair of vertical flasks 56 and 57 and a second pair of vertical flasks 58 and 59, supported on and fixed to the respective horizontal flat end portions 60, 61 and 62, 63 of a correspondent lengthened crosspiece 64 and 65, identical to each other, each one of which is shaped with a relative horizontal flat central portion 66 and 67 which is depressed with respect to its own flat end portions, and in turn such crosspiece flat central portions 66 and 67 are fixed to the circular rail 10 on positions internal to the same, in a manner that the crosspieces 64 and 65 are arranged parallel and spaced away to each other and that their relative flat end portions are all raised with respect to the upper flat edge 11 of such circular rail.

Some wheels with horizontal axis are pivoted on to each one of the vertical supporting flasks 56-59, which are slidable with a determinate stroke along a relative external guide groove 68 and 69 of the corresponding semicircular rail 49 and 50, said wheels in the illustrated example being formed by a first and a second pair of idle wheels 70 and 71, pivoted in a correspondent flask secured to the relative flat end portion 61 and 63 of the lengthened crosspieces 64 and 65, and a first and a second pair of idle wheels 72 and 73, co-operating as it will be described with a relative driving wheel 74 and 75, which wheels are pivoted in a correspondent flask secured to the relative flat end portion 60 and 62 of the lengthened crosspieces 64 and 65. In this way, when the semicircular rails 49 and 50 are driven contemporaneously with a circular movement by their own actuating mechanism 55, together with the curved walls 25-28 of the solar concentrator 8, the movement of such rails is guided, on the one hand, by the pair of idle wheels 70, 71, 72 and 73 slidable in the relative external guide grooves 68 and 69 of the same rails, and on the other hand is produced by the driving wheels 74 and 75 as it will be described.

With reference to the FIGS. 3, 4, 6, 7 and 19, the first actuating mechanism 20 is now described, for determining the rotation of the horizontal rail 10 in either one of its rotation directions A and B. Such mechanism is constituted substantially by a first gearmotor 76 fixed on to the horizontal base plate 17, on an external position approached with respect to the same rail, and connected to an electric power supply, as well as provided with a toothed driving wheel having vertical axis of rotation 77, which is driven by the same gearmotor and shaped for engaging and being partially wound with respect to a flexible and lengthened toothed transmission belt 78 made of suitable material, which is housed into the external guide groove 12 of the rail 10 and is fixed with its end portions to this guide groove, and has such a length as to allow the rotation of this circular rail on a horizontal plane with an established maximum stroke. In particular, when the driving wheel 77 is driven by the motorgear 76 in a determinate rotation direction, the toothed transmission belt 78 is displaced by the toothed driving wheel in the same direction, up to a determinate established stop position as it will be described, in which the circular rail 10 is displaced on the horizontal plane, together with the solar concentrator 8, on a position in which this latter is oriented with a certain inclination angle, to receive the solar radiation.

Under this condition, during the day the motorgear 76 is controlled continuously to rotate slowly, as it will be described, in the other rotation direction thereof, in which also the toothed driving wheel 77 is driven in the same direction, with consequent progressive and slow displacement of the toothed belt 78 and therefore also of the circular rail 10 and the solar concentrator 8 into this direction, and progressive orientation of this latter into different positions, up to the rail 10 is arrived on the other established stop position thereof, in which its rotation movement is stopped automatically, as it will be described, and the solar concentrator 8 is displaced and oriented with another inclination angle. Obviously, it is also possible to realize the actuating mechanism 20 with transmission members different that those described by way of example only, for example by providing a driving wheel 77 in the form of a toothed pinion, meshing with a corresponding crown gear fixed externally the circular rail 10, or chains or other driving and movement transmission members which are different and of traditional type, thus without departing from the protection sphere of the present invention.

The solar plant referred to is set in such a manner that on its starting position, before to set at work thereof, the solar concentrator 8 be oriented toward the sun with such an inclination as to receive the possible maximum solar radiation already from the early morning, and that under this condition it is set at work automatically, as it will be described, and during the entire day the rotation movement of the circular rail 10 and the solar concentrator 8 is controlled by the motorgear 76, so as to displace these components in a way that the solar concentrator be oriented toward the sun for receiving always the possible maximum solar radiation. Such rotation movement of the rail 10 and the solar concentrator 8 is stopped automatically in the relative stop position, with consequent plant operation stop, under the condition in which the solar concentrator is oriented toward the sun in a manner do not more receive enough solar energy for heating and generating electric energy for the solar plant referred to. At this point, the actuating mechanism 20 is controlled as it will be described with a rotation movement reverse to the preceding one, thereby displacing the circular rail 10 and the solar concentrator 8 up to the previous stop position, where this movement is stopped automatically as it will be described, so as to set the solar plant for a new operative cycle for the net day. With reference to the FIGS. 3, 4, 6, 17, 18, 19 and 20, the second actuating mechanism 55 is now described, for determining the sliding of the semicircular rails 49 and 50 from the one to the other one of their sliding positions C and D opposite to each other, up to a relative stop position thereof, such sliding being controlled independently from the rotation movement of the circular rail 10. This mechanism is constituted substantially by a second motorgear 79 connected to the electric power supply and fixed to a horizontal flat plate 80, supported by the vertical flask 56 secured as specified as above, in an external position approached to one of the semicircular rails, in the illustrated example the rail 50. Such gearmotor 79 is connected to the above described driving wheel 74, into which a lengthened rectilinear shaft 81 is keyed at its one end portion, and in turn the other end portion of such shaft is keyed with the other driving wheel 75 specified as above. In order to effect the movement transmission among the different idle and driving wheels described as above, there are provided a first and a second toothed and lengthened flexible transmission belt 82 made of rigid material, which are housed in the relative external guide 68 and 69 of the corresponding semicircular rail 49 and 50, and secured with their end portions in the guide of the relative rail (see FIG. 20), and have such a length as to allow the rotation of these rails on a vertical plane with an established maximum stroke, wherein each belt is partially wound around the relative idle wheels 72 and 73 and the correspondent interposed toothed driving wheel 74, 75. In this way, depending on the rotation direction of the rails 49 and 50 produced by the toothed driving wheels 74 and 75 actuated by the motorgear 79, the transmission belts 82 displace themselves in the same direction, thereby determining the movement into this rotation direction of such rails and therefore also of the solar concentrator 8 fixed thereto. This movement is effected, in either one of the rotation direction, up to a respectively established stop position determined as it will described, with consequent continuous rotation during the day of the solar concentrator 8 into different angular positions and orientations, on a vertical plane orthogonal to the horizontal rotation plane of the circular rail 10, in a manner that such concentrator so receive always the possible maximum quantity of solar radiation. Also in this case, the rails rotation movement occurs slowly, by controlling continuously the gearmotor 79, and is stopped automatically as it will be described when the rails 49 and 50 are arrived in the relative stop position, and the start and end of the rotation movement of these rails is controlled in the same ways as described previously for the rotation movement of the circular rail 10. The rotation movements of the solar concentrator 8 produced by the rotation of the horizontal rail 10 and the semicircular rails 49 and 50 occur in a manner independent to each other, as already explained previously, and also synchronized, by controlling during the day both the motorgears 76 and 79 with the criteria which will be described, in order to obtain always the scope to orient such solar concentrator in a manner to receive the possible maximum solar radiation. Also in this case, it is obviously possible to realize the actuating mechanism 55 with transmission members which are different than those described by way of example only, for example by providing the driving wheels 74 and 75 in the form of toothed pinions meshing with correspondent crown gears fixed in the relative external guides 68 and 69 of said semicircular rails, or also with chains or other different driving and movement transmission members and of traditional type, thus without departing from the protection sphere of the present invention. By referring now to the FIGS. 10-15, it is illustrated and described how the heating of liquids is effected and how the electric energy of the present solar plant is generated. The heating of liquids is effected by means of one or more heat exchangers, while the electric energy is generated by means of one or more photovoltaic panels, and these components are realized and combined to each other as it will be described. In particular, in the FIGS. 11 and 12 it is illustrated a heat exchanger 83 which is substantially constituted by a metallic plate 84 and a circulation conduit 85 arranged into thermal contact with such plate and shaped as a coil, such plate being secured alone or in combination with other analogous plates with relative conduits, to the load bearing structure 9 of the present solar plant, in a manner to be fixed in the focus point of the same plant, so as to receive the solar radiation received by the solar concentrator 8 and reflected by the reflecting material of this latter, which radiation is concentrated in the focus point and therefore on to the heat exchanger 83, thereby attaining the maximum thermal efficiency. In the present example, the metallic plate 84 is shaped with rectangular form, but is may be of course also shaped with different forms, thus without departing from the protection sphere of the invention. In turn, the circulation conduit 85 is provided for circulating and conveying the liquid to be heated and a suitable thermal carrier liquid, of traditional type, for example a glycol, adapted to improve the thermal exchange efficiency between the received solar radiation and the liquid to be heated. These liquids are contained into separated receptacles (not shown), and are conveyed in the conduits 85 of each heat exchanger 83 by means of one or more pumps, the suction side of which is communicating with the liquids, so as to suck the same from the relative receptacles, and the delivery side of which is communicating with the conduit inlet of each heat exchanger, which in the present example is marked with the reference numeral 86, in a manner that the liquids circulate through the relative heat exchanger 83, where such liquids are heated by the solar radiation, in a single circulation direction (in the example, marked with the letter A) and then, by passing through the conduit outlet of the heat exchanger, which in the present example is marked with the reference numeral 87, are introduced into one or more thermal insulated storage reservoirs (not shown) of adequate capacity, where they are stored and drawn when the use thereof is requested. As visible particularly from the FIG. 12, the circulation conduit 85 is advantageously included in the metallic plate 84 of the heat exchanger 83, which to this aim is realized with raised peripheral edges 88 and a depressed central zone 89, into which the coil conduit 85 is housed, the external surface of which is flushing with such raised peripheral edges 88. FIGS. 10 and 12 illustrate now a photovoltaic panel 90, which is constituted substantially by a plurality of photovoltaic elements 91 of traditional type, which in the shown example are shaped with rectangular form, which are arranged adjacent to each other and secured to a support structure 92 formed by corresponding boards 93 made of insulating electric material, provided with a set of electric contacts and conductors 94 which are put into contact with the electric supply conductors of the relative panel and connected to the relative photovoltaic elements 91, by connecting them in different manners, for example in series or in parallel, depending on the electric voltage and current level to be generated.

The assembly photovoltaic elements 91-boards 93 is then applied on to a flat plate 95 made of thermal insulating material (see FIG. 13), the size of which is slightly larger than that of the relative heat exchanger 83, and which is then fixed on to the metallic plate 84 of the heat exchanger, thereby obtaining a single support structure 96 (see FIGS. 14 and 15) formed by overlapping on to the heat exchanger 83 the insulating plate 95, the boards 93 and the photovoltaic elements 91.

In this way, thanks to the insulating plate 95, the photovoltaic panel 90 is separated and not into thermal contact with respect to the underlying heat exchanger 83, so that during the plant operation such photovoltaic panel receives only the solar radiation for generating the electric energy and isn't heated by the heat produced by the heat exchanger 83.

Figure 16:
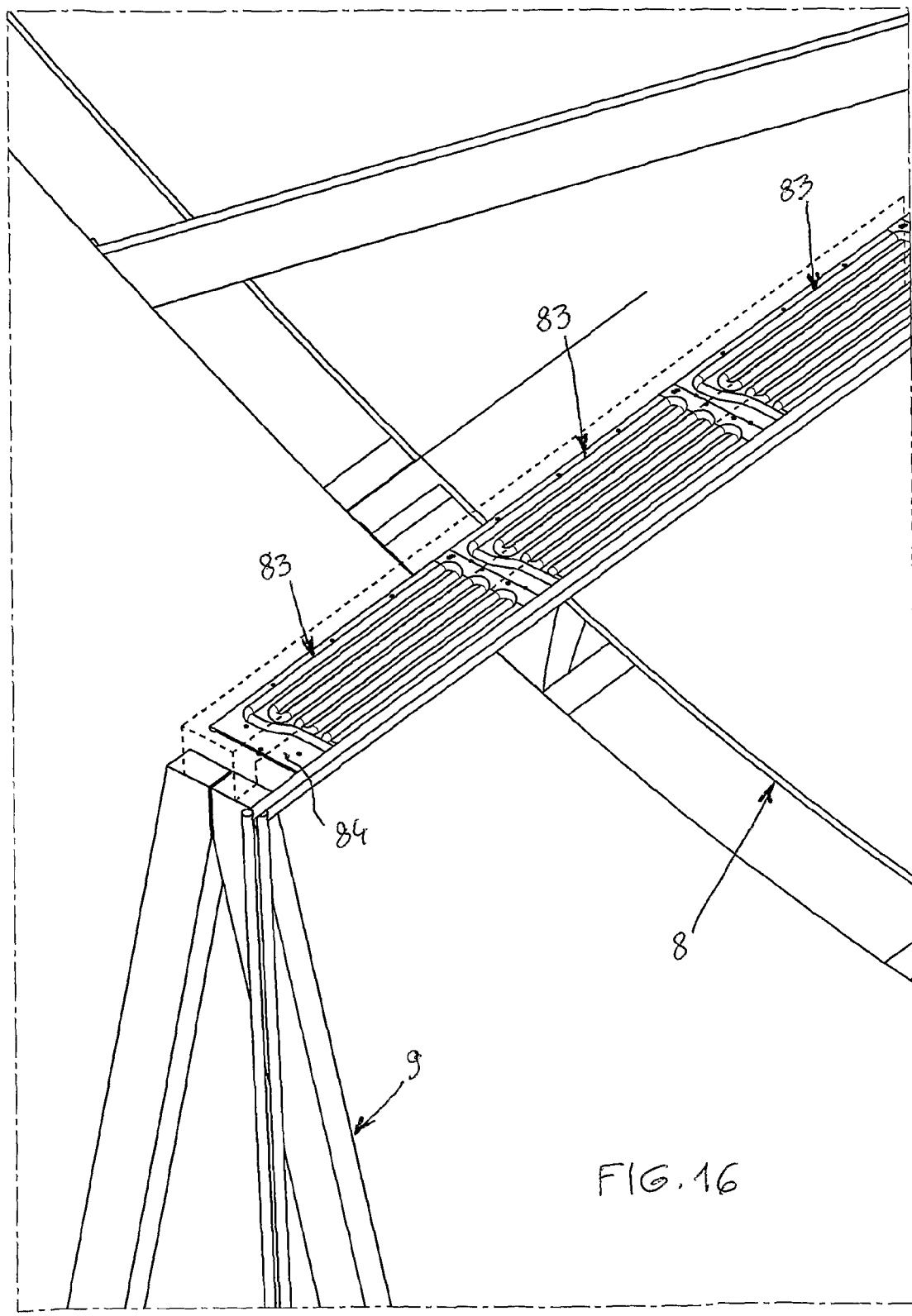
FIG. 16 shows an enlarged side perspective view of the assembling arrangement of the component parts of FIGS. 10-15 on the load bearing structure of the present solar plant.
Figure 17:
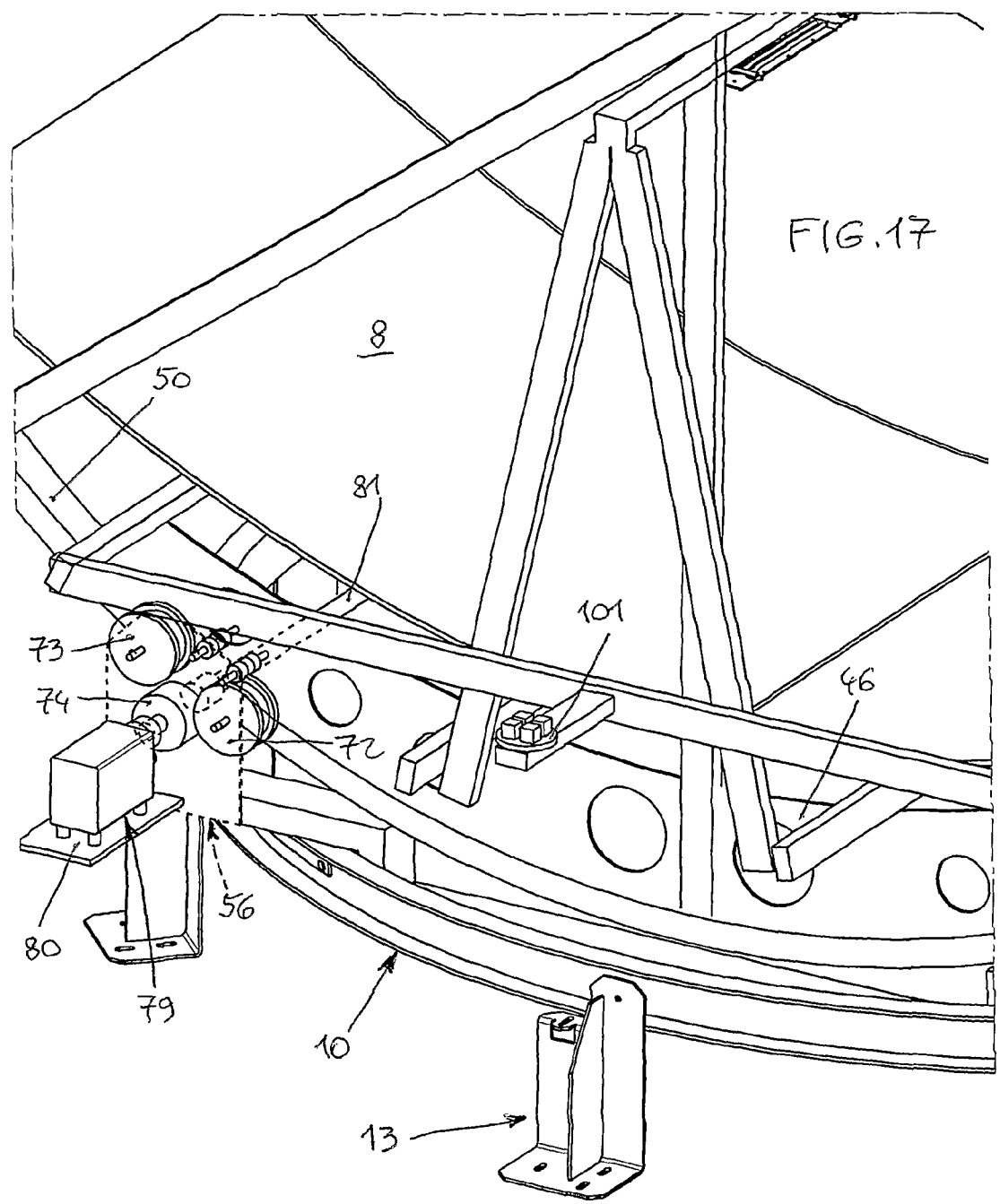
FIG. 17 shows a side perspective view of a mechanism for actuating the present solar plant.
Figure 18:
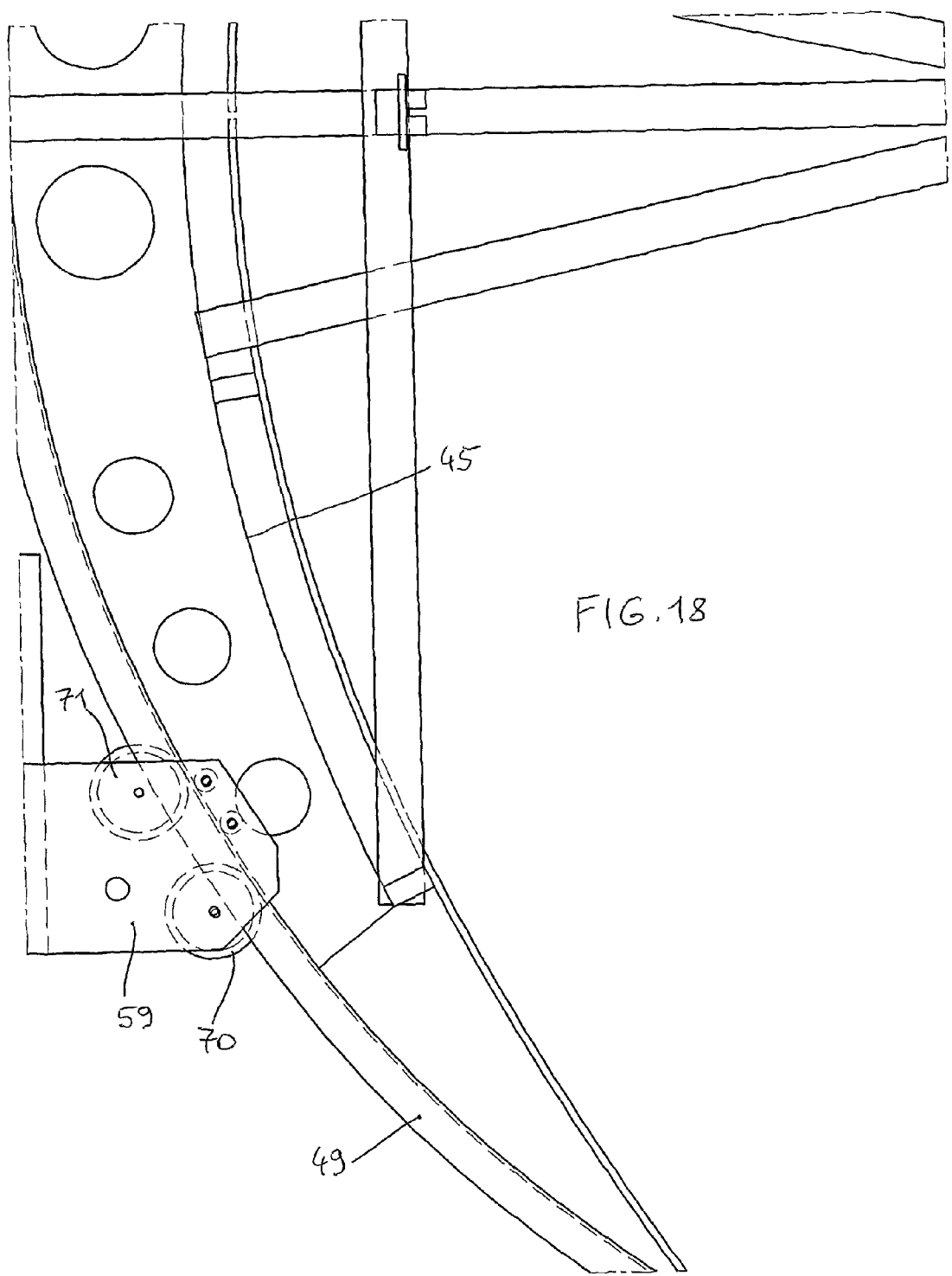
FIG. 18 shows a side view of the actuating mechanism of FIG. 17.
Figure 19:
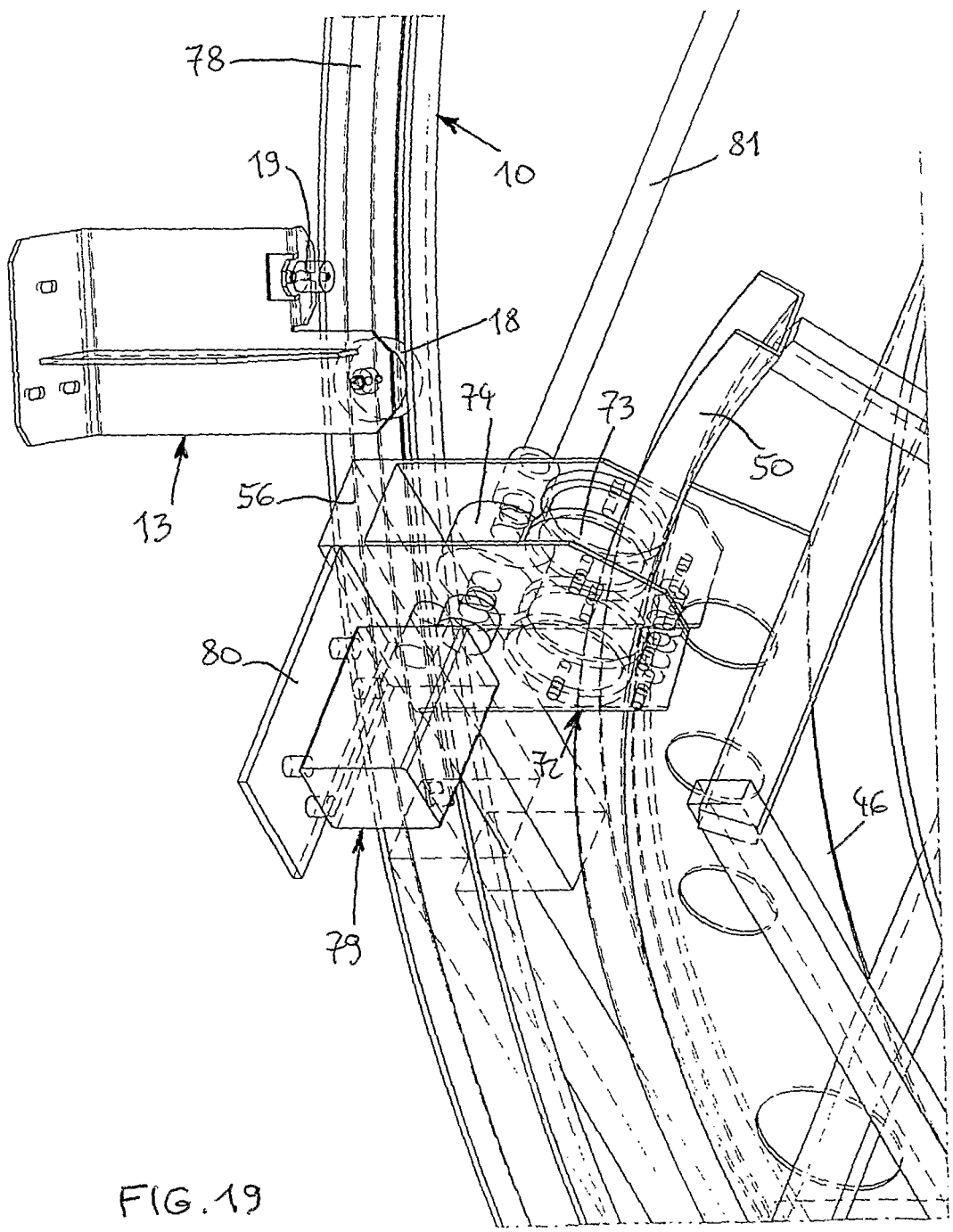
FIG. 19 shows a side perspective view, with a different angle of view, of the actuating mechanism of FIG. 17.
Figure 23:
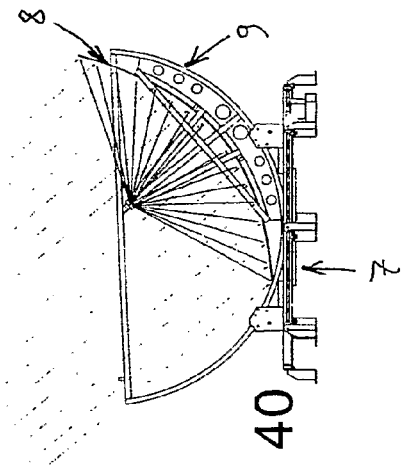
FIGS. 21, 22, 23, 24 and 25 show respective side views of the present solar plant, displaced into different operative positions during the day.
Figure 22:
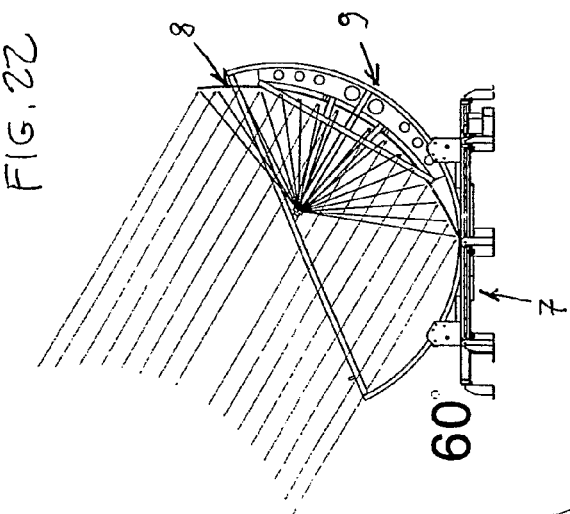
Figure 26:
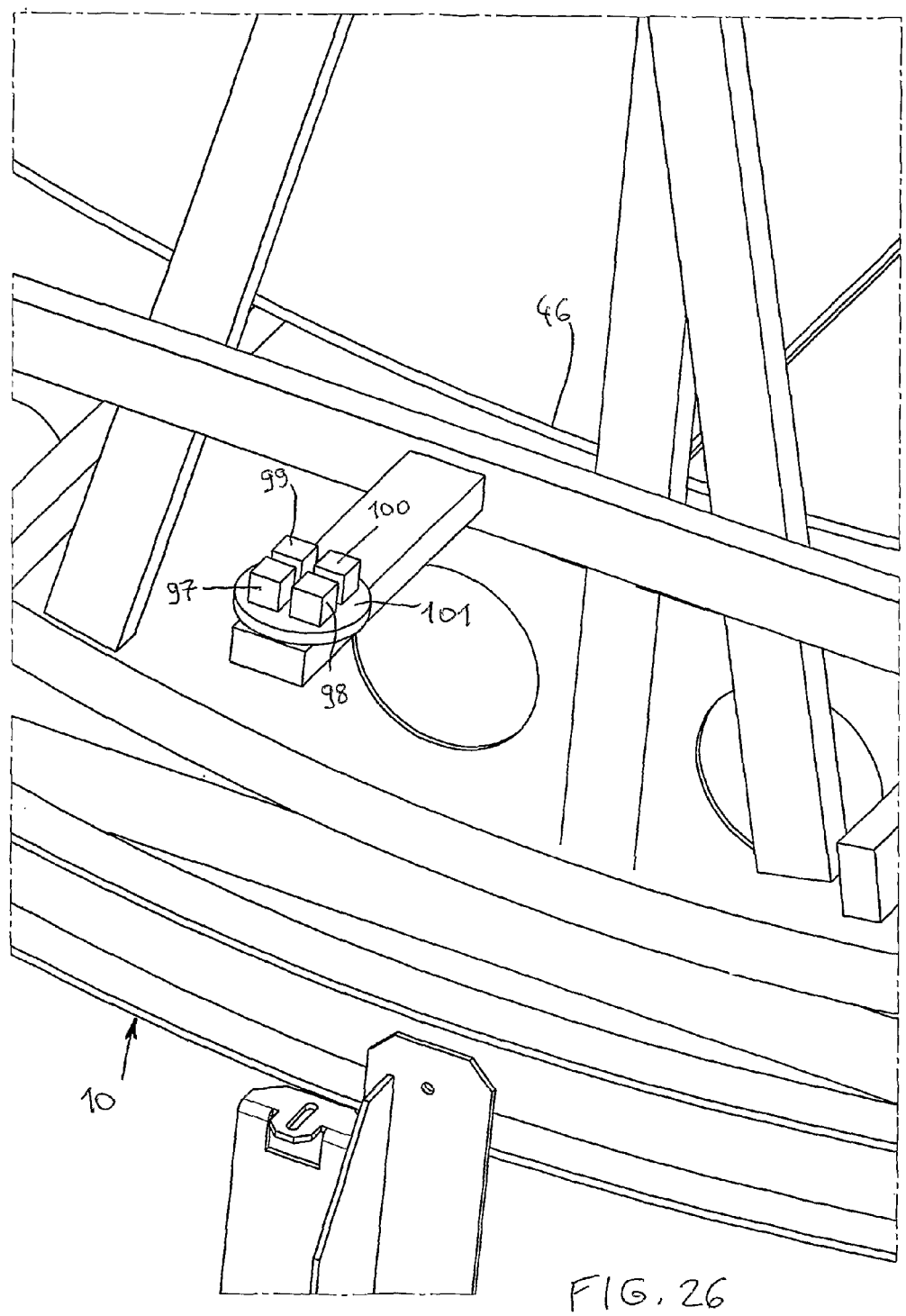
FIG. 26 shows an enlarged perspective view of a further component part of the present solar plant.

The so constituted support structure 96 is then covered by at least an upper glass plate (not shown) and applied in the solar plant, by securing it in the focus point of the solar concentrator 8, and with this arrangement the solar plant is so able to determine at the same time the heating of liquids for different uses and the electric energy generation, with high energetic efficiencies, and such combination of performances (heating and electric energy generation) was not possible to be obtained hitherto in the solar plants existing at the present time. The solar plant according to the invention may be realized by assembling one or more so constituted support structures 96 in the focus point of the solar concentrator 8. In the FIG. 16 it is now shown by way of example only a set of heat exchangers 83 made as described above, connected in series to each other, and supported by a single metallic plate 84 extended for the entire width of the solar concentrator 8 and secured to the load bearing structure 9 of the same plant. The heat exchangers and photovoltaic panels of the present plant may be realized with different numbers, for obtaining heatings of liquids with different temperatures and electric energy generation with different voltage and current levels, provided that the reciprocal arrangement of these component parts be always the same described previously, thus without departing from the'protection sphere of the present invention. Turning now the FIG. 26, in which some control sensors employed in the present solar plant are shown, to control the actuating gearmotors 76 and 79 respectively determining the rotation of the solar concentrator 8 respectively around the circular rail 10, on a horizontal plane, and along the semicircular rails 49 and 50, on a vertical plane orthogonal to such horizontal plane, it is noted that the control sensors are constituted by at least a first and a second pair of photoelectric sensors 97, 98 and 99, 100 arranged approached and aligned to each other and supported by a plate 101 of electric insulating material, secured to the solar plant load bearing structure 9, in such a position as that they are always turned toward the sun starting from early morning and for almost all the day, in a manner that these sensors are always illuminated by the solar radiation in this period of time. In particular, the photoelectric sensors of each pair of sensors are arranged aligned to each other in the longitudinal or transversal direction of their reciprocal arrangement on to the support plate 101, and the sensors of the first and second pair of photoelectric sensors 97, 98 and 99, 100 are adapted to control, as it will be described, respectively the first gearmotor 76 and the second gearmotor 79, so as to determine the movements of the solar concentrator 8 in the respective rotation directions and to this aim they are connected through electric conductors with a control and managing device for the operation of the present solar plant, which is made in the form of a microprocessor (not shown), mounted in the solar plant, and supplied by the plant electric power supply. In turn, also the gearmotors 76 and 79 are connected through conductors and suitable interfaces to the control microprocessor, in order to be actuated by this latter at determinate moments of the day and with determinate sequences, with consequent actuating of the solar concentrator 8 with corresponding movements. This control microprocessor is set in such a manner that to detect, during all the day, the electric signals generated by the photoelectric sensors which are illuminated by the solar radiation, which signals are proportional to the levels of the illumination received by the photoelectric sensors, by comparing the detected values of the electric signals generated by a sensor with those detected by the other sensor of each pair, in a manner to control the actuation of the gearmotor associated with such pair of sensors, when the values of the electric signals generated by a sensor are different from the values of the electric signals generated by the other sensor, and to stop the actuation of each gearmotor when such levels of electric signals of both the sensors are equal to each other. With this setting of the microprocessor, the sensors of each pair of photoelectric sensors are illuminated starting from early morning with illumination levels which may be identical or different to each other, depending on the orientation of the solar concentrator, while the sensors of the other pair of photoelectric sensors, which are displaced with respect to the preceding sensors, are illuminated with illumination levels which are different from those of the preceding sensors, and under such a situation it is supposed for example that the sensors of the front pair of photoelectric sensors are illuminated with the same illumination level, which fact means that in such hour of the day both these sensors are oriented correctly toward the sun, and therefore that also the solar concentrator 8 is oriented correctly and therefore can receive the maximum solar radiation and delivers the highest plant thermal efficiency. Then, under this condition the levels of the electric signals generated by both the sensors and detected by the microprocessor are equal to each other, and therefore the gearmotor associated to such sensors is controlled by the same microprocessor to be kept stopped. On the contrary, if in the same hour of the day the sensors of such front pair of sensors are illuminated with different levels of illumination, under the condition in which both these sensors aren't oriented correctly toward the sun, and therefore also the solar concentrator 8 isn't oriented correctly, with consequent thermal efficiency which is lower than that foreseen, the levels of the electric signals generated by both sensors and detected by the microprocessor are different to each other, and therefore the gearmotor associated to such sensors is controlled by the same microprocessor to be actuated in such rotation direction that to displace the sensors and the solar concentrator 8 up to their correct orientation position, under the condition in which the solar concentrator 8 still receives the maximum solar radiation and delivers the highest plant thermal efficiency. Also the back pair of photoelectric sensors operate with the same criterion, thereby activating the microprocessor to control the gearmotor associated with these sensors, so as to actuate the solar concentrator in the position in which it and the sensors are always oriented correctly oriented toward the sun, and therefore the solar concentrator receives the maximum solar radiation and delivers the highest plant thermal efficiency.

Figure 21:
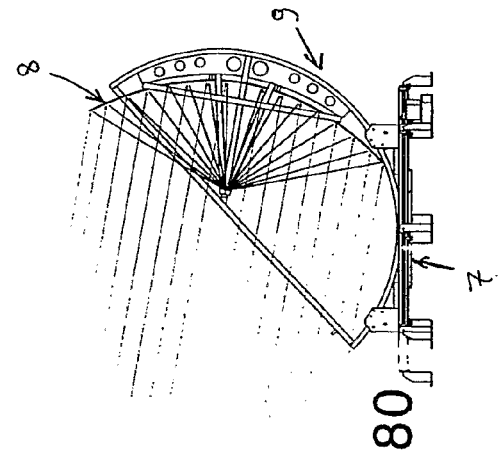
Figure 25:
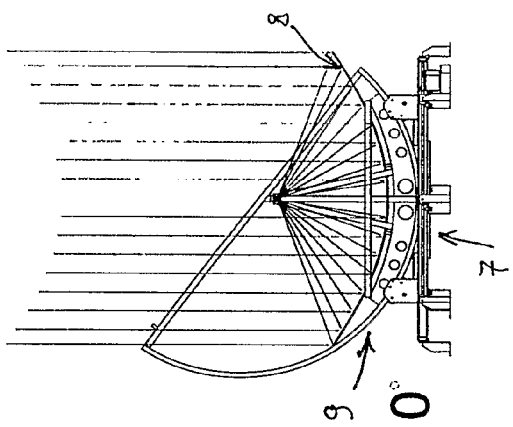
Figure 24:
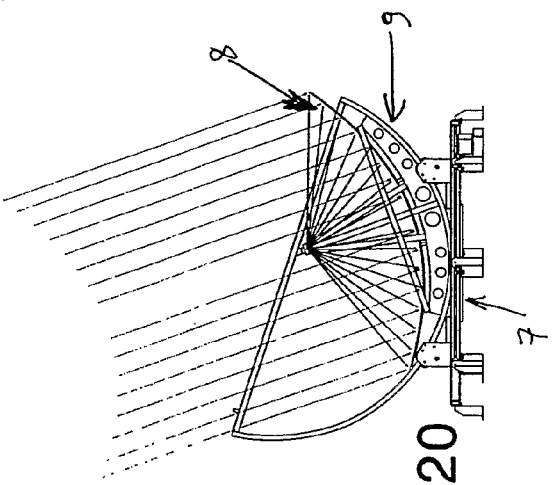

The solar concentrator 8 is so actuated continuously by the relative gearmotors, controlled by the microprocessor as described above, to be displaced slowly, with two movements which are independent and synchronized to each other, so as to be always oriented correctly for performing the functions specified above. When the solar concentrator 8 is displaced and oriented, together with the photoelectric sensors 97-100, in the position of maximum stroke at the end of the day, these sensors are illuminated with illumination levels which are lower than a pre-established minimum threshold, set in the microprocessor, and then under such condition the microprocessor detects that such minimum threshold has not been attained by the sensor illumination levels, and controls at first the gearmotors to displace the solar concentrator 8 in the starting position thereof, and thereafter stops such gearmotors and therefore the movements of the solar concentrator 8, thereby setting the plant for a subsequent operative cycle to be performed in the following day. Finally, by referring now to FIGS. 21-25, it is shown schematically the present solar plant, with its solar concentrator 8 oriented into different positions during the day, with movements controlled as described above, starting from an initial orientation of the same in the early morning, shown in the FIG. 21, up to a final orientation of the same concentrator in the evening, shown in the FIG. 25.

The invention claimed is:

1. A solar apparatus for concurrently heating liquids and generating electric power, said solar apparatus comprising:
  a) a solar concentrator (8) adapted for variable orientation relative to the sun during daylight, wherein the solar concentrator concentrates incident light onto a focal point;
  b) a load-bearing structure (9) including a plurality of longitudinally extending rectilinear bars (32, 33; 36, 37) and transversally extending rectilinear bars (34, 35; 38, 39, 40, 41, 42, 43; 44), a pair of semi-circular rails (49, 50) connected to said longitudinally and transversally extending bars and said solar concentrator (8), said semi-circular rails (49, 50) having end portions joined to each other by a pair of rectilinear bars (51, 52) and a pair of intermediate tie rods (53, 54), said load-bearing structures (9) further including a pair of semi-circularly shaped metal reinforcement members (45, 46) secured to said longitudinal bars (32, 33; 36, 37) and to said semi-circular rails (49, 50), said semi-circular rails (49, 50) being slidably supported by a first pair of vertical brackets (56, 57) and a second pair of vertical brackets (58, 59), the vertical brackets supported by and attached to respective horizontal end portions (60, 61; 62, 63) of a corresponding one of two elongated cross pieces (64, 65), each cross piece arranged parallel to and spaced from each other, said first and second pair of vertical brackets (56, 57; 58, 59) including sliding elements (70, 71, 72, 73) and motor driven wheels (74, 75);

c) a horizontally disposed load-bearing base structure (7) supported on a horizontal base plate (17) secured to the ground, said base structure (7) including a circular horizontal metal rail with a circumference (10) having a planar upper edge (11) and on outer groove (12) extending along the circumference of said circular rail (10), said rail (10) being supported by a set of lower metal brackets (13) regularly spaced along the circumference of said rail (10), each bracket (13) having a lower base (14) anchored to said horizontal base plate (17), a vertical shank (15) and an upper head portion (16) having idler wheels (18, 19) slidingly cooperating with said circular rail (10) so as to allow said rail to rotate reciprocally, said two elongated cross pieces (64, 65) of said load-bearing structure (9) being attached to said circular rail (10) whereby to support said load-bearing structure (9) and solar concentrator (8);

d) a heat exchanger (83) supported by said load-bearing structure (9) disposed at the focal point of said solar concentrator (8) so as to receive the concentrated solar radiation received by said solar concentrator, said heat exchanger (83) having liquid circulating therethrough heated by said concentrated solar radiation;

e) an electric power generator (90) supported by said load-bearing structure (9) disposed at the focal point of said solar concentrator (8) so as to receive the concentrated solar radiation received by said solar concentrator, said electric power generator (90) including a photovoltaic panel comprising a plurality of photovoltaic elements (91) arranged adjacent to each other and attached to a support structure (92) formed of corresponding boards (93) of electrically insulating material provided with related electric contacts and conductor paths (94);

f) a first actuation mechanism (20) for moving said solar concentrator (8) in a first reciprocating rotary motion in a circular direction in a horizontal plane along said load-bearing structure (7);

g) a second actuation mechanism (55) for moving said solar concentrator (8) in a second reciprocating motion along a path in a vertical plane orthogonal to said horizontal plane by actuating said motor driven wheels (74, 75) of said first and second pair of vertical brackets (56, 57; 58, 59) supporting said semi-circular rails (49, 50) connected to said solar-concentrator (8);

h) a first pair (97, 98) and a second pair (99, 100) of photoelectric sensors arranged close to and aligned with each other and supported by said load-bearing structure (9) so as to be constantly facing the sun during daylight so as to be constantly exposed to solar radiation during daylight, the sensors of said first and second pair of sensors are arranged in mutual alignment in a longitudinal or a transverse direction so as to detect the intensity of impinging solar radiation and actuate said first and second actuation mechanisms so as to cause said first and second reciprocating motions of said solar concentrator (8) to progress when both sensors of said first and second pairs of sensors are illuminated at different levels of illuminating intensity and to stop when both sensors are illuminated at the same level of illuminating intensity.

2. The solar apparatus defined in claim 1, wherein said second actuation mechanism (55) includes a motor reducer (79) attached to said first pair of vertical brackets (56, 57) slidably supporting said semi-circular rails (49, 50), the second actuation mechanism (55) further including a motion transmission mechanism which includes said motor driven wheels (74, 75) cooperating with said semi-circular rails (49, 50) and actuated by said motor reducer (79) to rotate said semi-circular rails in either direction so as to change the angle of orientation of said solar concentrator (8).

3. The solar apparatus as defined in claim 2, which further comprises a microprocessor adapted to detect electric signals generated by said photoelectric sensors (97, 98; 99, 100) so that when the microprocessor detects, in the full-scale position of said solar concentrator (8) along the maximum allowable movement path, that said photoelectric sensors are being illuminated at intensities below a minimum pre-set in said microprocessor it causes said first (20) and second (55) actuation mechanisms to be actuated so as to displace said solar concentrator (8) back to an initial position thereby setting the solar apparatus in a condition in which it is ready to start a new operating cycle.

4. The solar apparatus as defined in claim 3, wherein the assembly formed of said photovoltaic elements (91) and said boards (93) is positioned onto a planar plate (95) of heat insulating material slightly larger than said heat exchanger (83) to which said planar plate (95) is secured obtaining a single structure (96) wherein said photovoltaic elements (91) are not in thermal contact with said heat exchanger.

* * * * *